April 24, 1962  M. P. MANDARINO  3,030,951
METHODS AND MATERIALS FOR ORTHOPEDIC SURGERY
Filed April 10, 1959  2 Sheets-Sheet 1
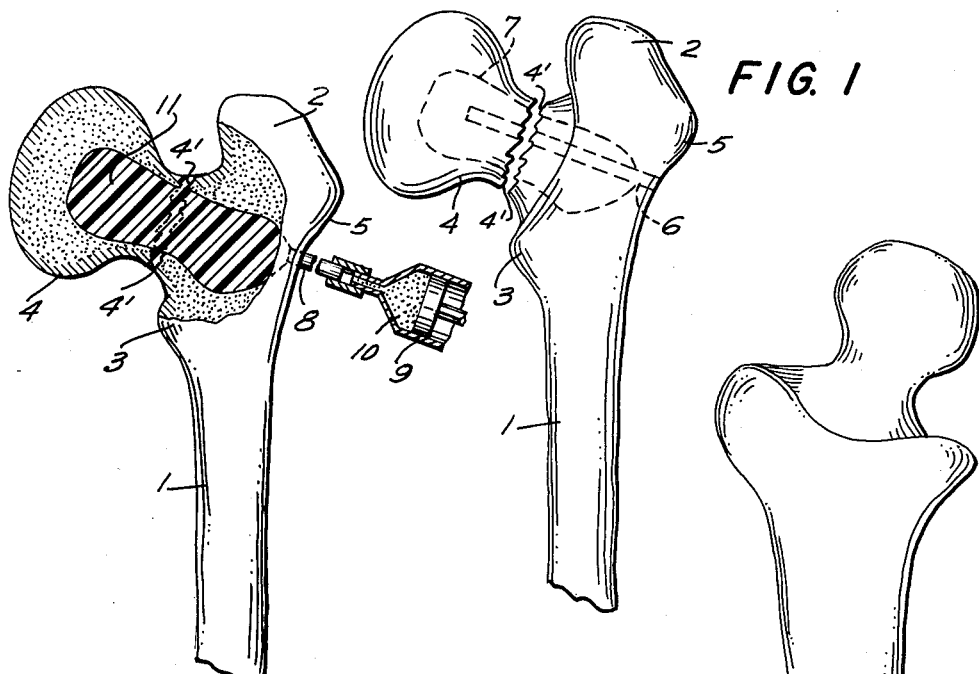
FIG. 1
FIG. 2
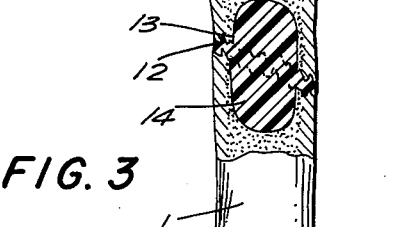
FIG. 3
FIG. 4
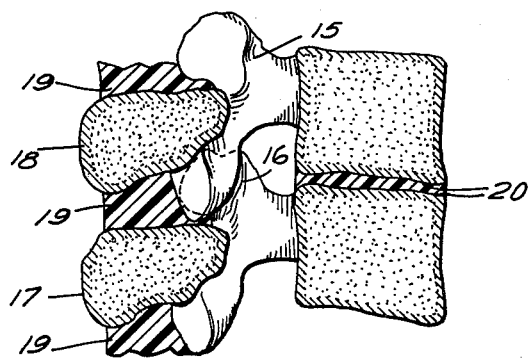
INVENTOR.
MICHAEL P. MANDARINO
BY
Harvey W. Ehrlich
ATTORNEY April 24, 1962 M. P. MANDARINO 3,030,951
METHODS AND MATERIALS FOR ORTHOPEDIC SURGERY
Filed April 10, 1959 2 Sheets-Sheet 2

INVENTOR.
MICHAEL P. MANDARINO
BY
ATTORNEY

United States Patent Office 3,030,951
Patented Apr. 24, 1962

3,030,951
METHODS AND MATERIALS FOR ORTHOPEDIC SURGERY
Michael P. Mandarino, Winding Way, Merion, Pa.
Filed Apr. 10, 1959, Ser. No. 805,545
9 Claims. (Cl. 128—92)

This invention relates generally to methods and materials to be applied in the treatment of fractured, deformed, necrotic and otherwise diseased bones, and more specifically to the use of synthetic polymers like the polyurethanes and other isocyanate polymers in such applications.

It is an object of this invention to minimize the conventional practices of traction, casting and extended immobilization in plaster casts and supplement bone grafting operations that prevail in the surgical treatment of broken and diseased bones. Prompt mobilization of a patient who is thus incapacitated not only enhances his morale, improves his health and vigor, contributes appreciably toward his economic rehabilitation, but can become a life-saving factor in the aged.

Another object of this invention is to provide the optimum conditions under which the polyurethanes and other isocyanate polymers which are characterized by properties of unique strength, stability, cohesiveness, adhesiveness, non-toxicity and non-irritability, may be used in orthopedic surgery.

Other objects of this invention will become apparent as the following description of the chemistry of the interactions and of the procedures and the techniques applied to specific fractures is developed. In the accompanying drawing:

FIGURES 1 and 2 are partial views of a human femur and a hip joint showing a commonly sustained fracture.

FIGURE 3 is a view of a femur showing a severe, oblique and gaping fracture.

FIGURE 4 is a view of a few vertebrae showing a typical bone fusion, posterior and anterior.

Figure 5:
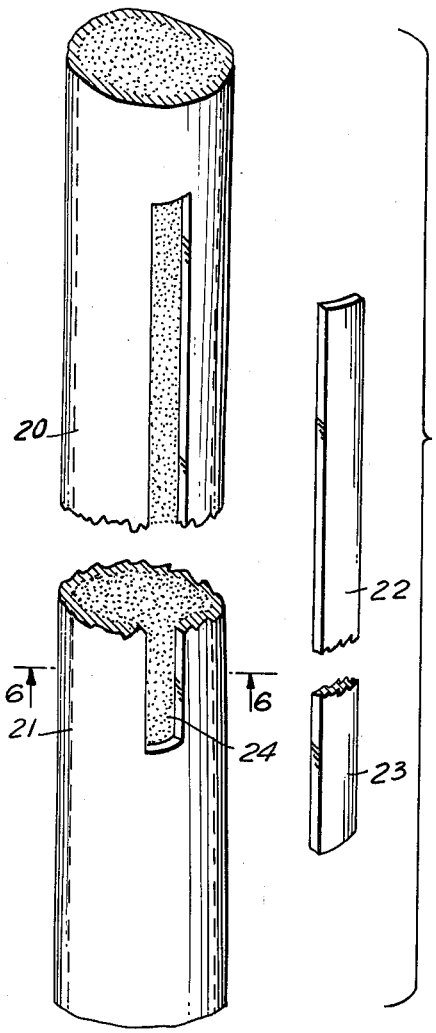
Figure 6:
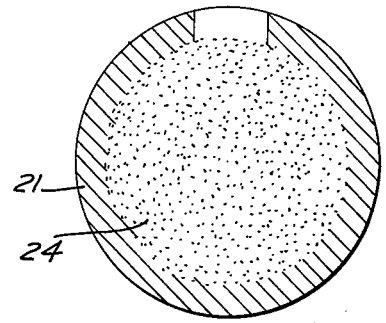
Figure 7:
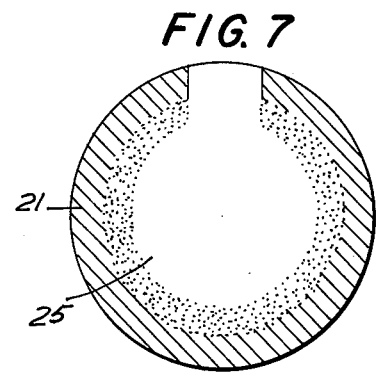
Figure 8:
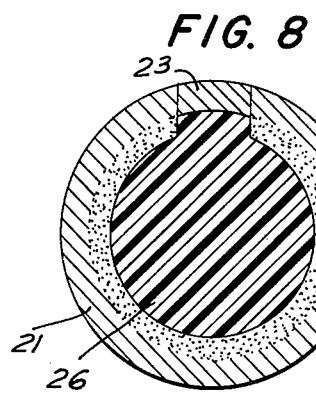

FIGURES 5, 6, 7 and 8 are views indicating a preferred method of repairing severe fractures of the long bones, FIGURE 5 being an exploded perspective of sections of a fractured long bone prepared for repair; and FIGURES 6, 7, and 8 are cross-sectional views taken on the line 6—6 of FIGURE 5 illustrating steps of the repair process.

In this invention, novel uses for polyurethanes and other isocyanate polymers are disclosed, particularly as the properties of these synthetic polymers are susceptible of unique application in the art and science of orthopedic surgery. Heretofore, in the branch of surgery known as orthopedics, the methods in vogue and commonly accepted involve casting, splints, metallic rods and screws, traction devices, and prolonged immobility in bed. After conisderable research coupled with extended experimental effort, it is now feasible to apply advantageously polyurethanes and other isocyanate polymers as a cementing and a bonding material in the treatment of fractures, necroses, deformities, fusions and diseased bone areas in order to give the requisite strength, cohesion and adhesion and to eliminate torsion for completely satisfactory clinical and unimpaired physical results.

The novel techniques of bone surgery as disclosed by this invention are dependent upon a unique utilization of the unusual properties of certain of the polyurethane polymers. This versatile class of materials may be formulated to obtain synthetic elastomers, adhesives and flexible or rigid foams. The foams available range from soft flexible foams of extremely low density to tough, rigid foams of great strength. The present invention is particularly concerned with the use of these latter foams.

Rigid polyurethane foams suitable for use in practicing the process of the present invention can be obtained in a density ranging from 20 to 40 pounds per cubic foot. They can be formed in place without the application of heat or pressure, completely filling irregular cavities in which the foam-forming materials are placed. The compression, tensile, shear and impact strength of these foams are of the same order as bone itself. They are little affected by water or blood serum. They are physiologically inert and are non-toxic, non-irritating and non-allergenic.

Rigid polyurethane foams are formed by a highly complex series of chemical reactions which involve diisocyanates, polyols, water and a polymerization catalyst. More specific details concerning the nature of these reactants and the manner in which they are used will be given hereinafter. It is sufficient to say at this point that the preparation of polyurethane polymer foams of widely different characteristics is known to those skilled in the art.

Application of rigid polyurethane foams to repair damaged bone structures may be better understood by again referring to the drawings.

Referring to FIGURE 1, a human femur is represented by numeral 1. The greater trochanter is indicated by 2 and the lesser trochanter by 3. The neck 4 of the femur is shown fractured along line 4'—4'. The fracture illustrated is one of many intracapsular fractures of the hip joint in which the technique of this invention has been applied. Briefly the steps of this technique are to make a small stab wound over the greater trochanter 2 in order to expose the cortex 5 of the bone. A hole 6 of small diameter is drilled and a suitable portion of the relatively soft bone tissue is removed with a curette to form a space to receive the polymer as indicated by the dotted lines 7. A tube 8 (Figure 2) is inserted in the medullary canal in the neck of the femur through hole 6, and a syringe 9 is attached to the tube. With the tube in proper position, its free end attached to the syringe 9, shown in part and in section, containing materials 10 which will polymerize to produce a polyurethane foam of the desired properties, the foam-forming materials 10 are propelled through the tube 82 as it is slowly withdrawn. The synthetic polymer is deposited within the cavity which has been formed in the intermedullary canal; and as the polymerization reaction and foaming take place, the polymer swells and completely fills the cavity and the adjacent spaces between the bone structures as indicated by the cross-hatching 11 of FIGURE 2. The polymer sets within a few minutes and imparts a strong and stable support to the fracture site, permitting it to accept after forty-eight hours of "cure" a normal load of weight bearing that may be thrust upon it.

A modified technique uses a wide incision in order to expose the fracture site. A suitable quantity of the soft bone tissue is removed from the intermedullary canal as may be necessary, and the synthetic polymer is injected directly into the cavity in sufficient quantity to completely fill it and the adjacent spaces between the fractured bone segments. In all techniques, X-ray control is employed to determine the proper alignment of the fractured parts.

FIGURE 3 illustrates a long bone 1 shown partly in section having a gap 12 in its shaft following a severe injury. In this instance, a quantity of the soft bone tissue from the intermedullary canal has been removed as described above to provide spaces for the polyurethane foam as indicated by the line 13. With the bone set in proper alignment, a tube is inserted through the gap into the cavity and the liquid, partially polymerized polyurethane material is injected into the space in sufficient quantity to completely fill it when the material has expanded to its full extent. Excess polymer is removed, leaving the polyurethane polymer 14 in the space indicated by cross-hatching. When the polymer has set, the injured member is restored to its function and may assume its task of bearing weight. In occasional cases, vitallium rods or the like may be inserted into the intermedullary canal to lend reinforcement to the binding synthetic.

FIGURE 4 is a drawing partly in section of several vertebrae 15 and 16. A posterior fusion of two vertebrae is effected by first making a longitudinal incision over the spinous processes. Then the laminae 17 and 18 are exposed bilaterally and denuded of soft tissue. A mixture of the synthetic fluid, unpolymerized polyurethane is poured over the exposed laminae and allowed to come to full expansion during a period of approximately ten minutes. The excess synthetic cement is molded or cut away and the wound closed in layers with wire sutures. The hardened polyurethane polymer cementing the bony structure together is indicated by numeral 19. FIGURE 4 also shows the site for an anterior vertebral body spine fusion. A few milliliters of the synthetic polymer are injected through the incised annulus fibrosus, allowed to "cure," and thereby produce a solid immobile anterior fusion of the spine. The polymer is indicated at 20.

FIGURES 5, 6, 7, and 8 illustrate a preferred embodiment of the practice of the present invention. In this method, the fractured bone segments 20 and 21 are exposed and a cortical inlay graft 22 and 23 is removed with a Luck saw, exposing the medullary canal 24. The soft marrow is removed from the canal 25 as shown in FIGURE 7. The components of the final polyurethane polymer are then thoroughly mixed together and poured immediately into the cavity. As the polymerization reaction takes place, carbon dioxide is formed causing the material to swell and completely fill the cavity, from which the contents of the medullary canal have been removed, and the adjacent spaces. The excised cortical inlay graft is replaced before the polymer sets up to a hardened condition, thus promoting the filling of the medullary canal as the polymer expands. Lowman clamps may be used to hold the inlay graft in position and to maintain the reduction of the fracture. The clamps are held in place while the polyurethane 26 hardens (FIGURE 8). The excess polyurethane foam may be removed by cutting with a scalpel in about five to ten minutes after the material is poured into the cavity but before it has become unduly hard. An additional forty-eight hours for curing should pass before weight bearing is permitted, and the patient should be immobilized during this time with a posterior splint.

If desired, the cortical inlay graft may be reversed as in commonly accepted bone grafting procedures, thus tending to make a better joint.

The basic reaction in the formation of a polyurethane is the well-known reaction of an isocyanate with an alcohol to form a urethane:

RNCO+R'OH→RNHCOOR' in which R and R' represent non-functional residues.

In the preparation of a polyurethane polymer, this reaction frequently is carried out as a separate step in the process and is referred to as the preparation of the urethane prepolymer. Such prepolymers are formed by the reaction of a polyol (polyesters or polyethers containing a number of alcoholic hydroxyl groups are preferred) with an excess of an isocyanate containing two or more isocyanate groups.

The reaction of an excess of a diisocyanate (OCN—R—NCO)

with a dihydroxy polyol (HO—R'—OH) is represented as follows:

2 OCN—R—NCO + HO—R'—OH ⟶

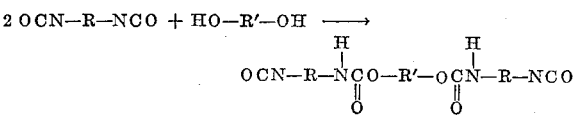

The adduct obtained in this primary reaction is a polyisocyanate and can react with more of the polyol to extend the chain length of the prepolymer. Since an excess of isocyanate is used, the prepolymer will always contain some reactive terminal isocyanate groups. These excess unreacted isocyanate groups are very significant in the subsequent reactions which occur in the preparation of foams.

The reaction of an isocyanate with water to form a urea and carbon dioxide is very important in the preparation of polyurethane foams, since this reaction is employed generally to produce the gas (carbon dioxide) for the foaming operation.

This reaction occurs stepwise, the net result being:

2 RNCO+H$_2$O→RNH.CO.NHR+CO$_2$

Thus, one mol of water reacts with two mols of isocyanate to give a symmetrically disubstituted urea and carbon dioxide.

The prepolymer, being a polyisocyanate, will react with water in a similar manner.

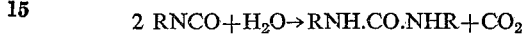

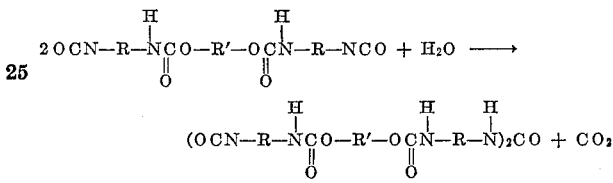

This reaction can continue, with polymer chain extension, as long as both isocyanate groups and water remain. Any free isocyanate (OCN—R—NCO) present will react with water in a similar manner.

As pointed out previously, this reaction is important because it produces the gas (carbon dioxide) for foaming. This sensitivity to water necessitates, on the other hand, that water be rigorously excluded from the isocyanate and prepolymer. Otherwise, urea formation will occur (in stages prior to the foaming operation) and result in higher viscosity of the prepolymer and increased stiffness of the final foam.

The urethane groups formed in the prepolymer reaction may react with excess isocyanate groups to form allophanates:

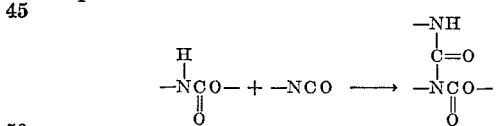

The straight lines are used here to represent long polyurethane chains. This reaction results in branching and cross-linking of the polymer chain. It becomes a significant reaction only at processing temperatures above 100° C. or in the presence of strong bases.

Although branching and cross-linking are desirable in rigid foams, this reaction should be controlled to occur principally at the foaming and curing stages. If it takes place to an appreciable degree in the preparation of the prepolymer, the viscosity of the prepolymer is increased and gelation may result.

Various other side reactions may occur. For example, urea groups may react with excess isocyanate groups to form biurets. Although this reaction is desirable to a degree in the foaming and curing stages to produce branching and cross-linking, it is objectionable in the preparation of the prepolymer as it tends to increase the viscosity of the prepolymer. It can be eliminated by excluding moisture from the reactive prepolymer system.

Trimerization of terminal isocyanate groups in the prepolymer may also occur. This side reaction is promoted by bases; and if it occurs during the preparation of the prepolymer, excessive viscosity may result.

Since isocyanates react with carboxylic acids, the polyols used should have a few free carboxylic groups as possible. The polyesters and other polyols should, therefore, have as low an acid number as possible.

In addition to the primary reactants, minor ingredients are added to control the reactions which occur. A catalyst is used to promote or speed up the reactions of the isocyanate with polyol and water. Emulsifiers may be added to facilitate mixing and to obtain proper viscosity relationships during the foaming process. The overall reaction is exothermic, no external heat being required during the foaming operation.

In general, a 5 to 10 percent excess of isocyanate is used over the amount required to react with the polyol and water. Thus, when all the reactive groups in the polyol and all the water have reacted, some isocyanate groups remain at the ends of the polymer chains. These isocyanate groups may react at the maximum foaming temperature, or during the curing process, with urethane, urea or amide groups within the polymer chain. These reactions lead to branching and cross-linking of the chains. In the presence of the tertiary amines used as a catalyst, some trimerization of the terminal isocyanate groups may also occur. Foams which are prepared with a 5 to 10 percent excess of isocyanate will have optimum properties.

Rigid foams are prepared from highly branched polyols with a hydroxyl number of 350 or higher. Such polyols give highly cross-linked networks of polymer molecules. Varying the degree of branching in the polyol, or blending linear and branched polyols, makes available an extremely wide range of properties in the final product.

The reaction of water with isocyanate groups provides the gas for foaming. Control of the amount of water used provides an independent control over the type of foam obtained and the density of the foam. The more water used, the more gas evolved, and hence the lighter the foam will be.

In preparing the rigid polyurethane foams, the polyhydroxy constituents generally are highly branched polyethers or polyesters having three or more hydroxyl groups per molecule.

The polyether polyols should have a hydroxyl number of 350 or higher. Useful polyhydroxy polyethers are those obtained from the condensation of propylene oxide with branched triols such as glycerine or 1,1,1-trimethylolpropane, branched tetra-ols such as pentaerythritol, and branched hexa-ols such as sorbitol. These highly branched polyethers, which contain three or more hydroxyl groups per molecule, may be blended with linear polyethylene glycols; but such a mixture would still have a hydroxyl number of 350 or more. The simple triols, such as glycerine and trimethylolpropane, may also be used in such blends.

Useful polyester polyols include highly branched polyesters, such as esters obtained from adipic acid and triols such as glycerine and trimethylolpropane, mixed esters obtained from adipic acid and a triol (e.g., glycerine) and a glycol (e.g., ethylene glycol), and triglycerides of hydroxyl-substituted fatty acids, such as ricinoleic acid. Such polyesters should have a molecular weight in the range of 1000–3000, a hydroxyl number in the range of 250–450 and a low acid number, less than about 6.

The polyhydroxy constituents of a given formulation may be a blend or mixture of simple polyhydric alcohols, polyethers and polyesters.

The polyhydroxy constituents provide the long polymer chains which appear in the final product. Depending on the polyol, these chains may be highly branched. Of course, additional branching of the polymer chains (and cross-linking) is produced by reactions of the isocyanate functions.

The concentration of the polyhydroxy constituents in a rigid foam formulation may vary from 30–80 percent of the total amount of ingredients, but preferably this concentration would be in the range of 40–60 percent of the total.

Of the isocyanates, tolylene diisocyanate is the most widely used of the commercial diisocyanates. It is the cheapest to produce and has the added advantages of being a liquid at room temperature, not dimerizing readily on standing, and having a moderately low vapor pressure, so that it is not a serious lachrymator if handled with reasonable precautions. The cheapest and most readily available commercial product is the 80/20 mixture of 2,4- and 2,6-tolylene diisocyanates. Also available is a 65/35 mixture of the two isomers. The pure 2,4-isomer is the most expensive, but all may be used if desired.

Other aromatic di- and tri-isocyanates have been and may be used, including 1,5-naphthalene diisocyanate, 4,4'-diphenylmethane diisocyanate, 1,4-phenylene diisocyanate, and 4,4',4''-triphenylmethane triisocyanate.

The diisocyanate used in a rigid foam formulation may constitute 30–60 percent of the total amount of ingredients, but this concentration preferably will be in the range of 40–50 percent of the total. The molar ratio of isocyanate groups to hydroxyl groups will be at least 2:1. Practically, this molar ratio will be higher; e.g., 2.5:1 or even 3:1. As a result, for rigid foam formulations, the excess of free isocyanate groups will be 10–35 percent, but preferably in the range of 10–20 percent. Such a value obviously will be determined only where the "prepolymer" technique is used. This excess is required for the foaming reaction and the cross-linking reactions which take place later.

Tertiary amines are used as catalysts to promote or accelerate the reactions which occur between polyols and diisocyanates. Strong bases (e.g., sodium and potassium hydroxides) exert a very vigorous effect on some or all of the reactions; and for this reason, strong bases are not used as catalysts. The reactants (polyols and tertiary amines) should be free of traces of strong inorganic bases.

Examples of useful tertiary amine catalysts include tripropylamine, N-methylmorpholine, N-ethylmorpholine, triethylenediamine, and tertiary amines which also contain reactive hydroxyl groups, such as 2-diethylaminoethanol, N,N-bis-(2-hydroxyethyl)-ethylamine, and N,N,N',N' - tetrakis - (2 - hydroxypropyl)-ethylenediamine (Quadrol). The latter three compounds act not only as tertiary amine catalysts but also contain hydroxyl groups which can react with excess isocyanate groups in the polyurethane polymer system. Tertiary amines of this type are, therefore, part of the polyol constituents in the formulation. Tetrakis - (2 - hydroxypropyl)-ethylenediamine, for example, is a particularly good catalyst to promote cross-linking in the foaming process, since it is a highly branched polyhydroxy tertiary amine. N,N-dialkyl aromatic amines (e.g., dimethylaniline) are not good catalysts for these reactions.

Traces of heavy metal compounds, such as cobalt naphthenate and ferric acetylacetonate, are sometimes added to the catalyst or activator mixture. These heavy metals appear to be catalysts for the reaction of isocyanate with hydroxyl groups and also to promote trimerization of the isocyanate groups.

The concentration of tertiary amine catalyst in the total polymer mixture may vary from as little as 1 percent to as much as 20 percent, although the amount of catalyst preferably would be in the range of 5–10 percent of the total. A higher percentage (e.g., 10–20 percent) of tertiary amine is generally used where this compound also is a part of the polyol system, as in the case of tetrakis-(2-hydroxypropyl)-ethylenediamine.

As mentioned before, the reaction of water with excess isocyanate groups is generally used to produce the gas for the foaming operation. As has been pointed out, 1 mol of water will react with 2 mols of isocyanate to produce 1 mol of carbon dioxide. Due to the low molecular weight of water, the actual amount of water required is quite small, particularly in the case of a rigid foam. In practice, the amount of water used will be 90–95 percent of the amount required theoretically to react with the excess isocyanate groups present since it is desirable to have some excess isocyanate groups available at the foaming and curing stages to undergo the branching and cross-linking reactions. The amount of water used in a rigid foam formulation will not be over 1 percent of the total amount of ingredients used.

As indicated above, the rigid polyurethane foam is formed in situ; that is, in the bone cavities or in spaces between bones or bone segments sought to be united. The material is applied in a viscous liquid form. The chemical reactions which take place just prior to setting up of the polyurethane to a rigid foam mass are relatively rapid and the polymer-forming substituents must be applied rapidly and with care.

Various methods of application are available. In the "one shot" method, the diisocyanate, polyols, catalyst and water are mixed in proper proportions simultaneously and are thoroughly agitated. Since several mild exothermic reactions take place simultaneously in this procedure, some heat is evolved. Fortunately, however, the heat does not become excessive as in the case of certain other rapid-setting polymers; and in practice, no trouble is experienced nor are special techniques required on this account.

To obtain better control of the reaction and more uniformity of polymer properties it is desirable in some circumstances to prepare a prepolymer by reacting the diisocyanate and the polyols. As indicated above, these reagents should be substantially free of water, containing no more than about 0.1 percent. The prepolymer which is formed would also be maintained under anhydrous conditions after it has been developed and until just before it is to be used. To minimize the possibility of water absorption during the prepolymer preparation, hydroscopic polyols such as glycerol may be eliminated from the prepolymer and incorporated in the activator mixture (water and catalyst) or may be eliminated as components of the polyurethane foam altogether.

The reaction between the isocyanate and polyols to form a prepolymer should be controlled so that the temperature does not rise above 100° C. The mixture may be heated for a short time, one or two hours at 80–100° C., to complete the primary reaction. The end point of the prepolymer reaction may be determined by controlling the excess isocyanate groups which for a rigid foam should be in the range of 10–35 percent, although preferably in the range of 10–20 percent. Although a certain degree of branching and cross-linking in the prepolymer is desirable, and this can be done by heating the prepolymer for a short time, one-half to one hour at 110–120° C., prolonged heating above 100° C. causes a rapid increase in viscosity which is undesirable.

Generally in preparing a prepolymer, it is preferable to add the poylol constituents to the diisocyanate, thus making it possible to maintain the proper ratio of isocyanate to hydroxy groups of 2.5:1 to 3.0:1.

The prepolymer prepared as just described can be packaged in moisture-proof containers and stored until ready for use. When the surgeon is prepared to join the damaged bone segments together, the activator is added to the prepolymer, the mixture thoroughly stirred and then placed in the cavities between the segments. The foaming process starts soon after mixing and continues until the polyurethane resin has set up to a rigid foam, usually three to five minutes.

The density of the rigid polyurethane foam should be between 20–40 pounds per cubic foot, 30–40 pounds being preferred where high mechanical strength is necessary. The density of the final foam can be controlled by the amount of excess isocyanate groups present and the amount of water used for foaming and the temperature during the foaming and curing stages.

EXAMPLE

Composition of the Prepolymer

|  | Grams |
|---|---|
| Castor oil | 21.8 |
| Ricinoleyl alcohol | 4.6 |
| Glycerine | 1.4 |
| Tolylene diisocyanate | 32.6 |
| Corn oil | 0.6 |
|  | 61.0 |

Preparation of Prepolymer

The reaction is carried out under anhydrous conditions in an atmosphere of dry nitrogen gas. The castor oil, ricinoleyl alcohol and tolylene diisocyanate (80/20 mixture of 2,4- and 2,6-isomers) are mixed and the exothermic reaction causes the temperature to rise to 90–95° C. After fifteen minutes, the glycerine is added dropwise and the temperature rises to 100° C. With stirring, the mixture is then heated to 120° C. and maintained at this temperature for one hour. The mixture is cooled rapidly to 60° C. and a sample withdrawn for a determination of unreacted (excess) isocyanate groups present. The isocyanate content is adjusted to 15.5 percent by the addition of tolylene diisocyanate. The corn oil (used empirically as a diluent) is added, the entire mixture stirred well and poured into clean, dry containers.

Composition of Catalyst or Activator Mixture

|  | Grams |
|---|---|
| Tetrakis-(2-hydroxypropyl)-ethylenediamine | 28.58 |
| 2-diethylaminoethanol | 1.28 |
| Water, purified | 0.117 |
| Ferric acetylacetonate | 0.023 |
|  | 30.000 |

Preparation of Catalyst

The four ingredients are combined under an atmosphere of dry nitrogen gas and stirred at 50° C. for one hour to facilitate mixing. The mixture is poured into clean, dry containers.

Containers of each component are placed in an oven and heated to 135° C. The total heating time is three hours, about one-half of this period being required to heat the containers from ambient temperature to 135° C. Samples of each component are then tested for sterility.

The polyurethane foam-forming compositions just described may be stored until ready for use. When they are to be used, the orthopedic surgeon first prepares the site of application as described above, being careful to see that excess moisture, fat and other undesirable material is removed from the bone with which the polymer-forming components come in contact. When the bone segments to be repaired are ready, the containers holding the prepolymer and the catalyst are opened and 14 milliliters of the catalyst is thoroughly mixed with the contents (61 grams) of the prepolymer container by rapid stirring. Within a very short time, usually less than one minute, an exothermic reaction commences to take place and foaming develops. The still viscous mixture is then immediately poured or injected into the desired site. A spatula or other instrument may be used to facilitate the application of the mixture. As the reaction continues, foaming increases and the volume of the foam likewise increases. Within five minutes, the polyurethane foam commences to become tacky and later rigid; and finally it sets to a hard (but not brittle) strong, porous mass. Excess material should be removed while the polymerizing material is still soft and tacky.

When using the "one shot" technique, all of the above materials, or other equivalents as described above, may be mixed together simultaneously with efficient stirring and applied in essentially the same manner.

As pointed out above, considerable variation is possible in the composition of the polyurethane foam. Variations in the proportions of the isocyanate and polyol may be made within the ranges indicated above. Hygroscopic materials such as glycerin may be incorporated in the activator or eliminated altogether. Metallic catalysts such as ferric acetylacetonate may be eliminated. Various other tertiary amines may be used as catalysts. Diluents such as corn oil, which is used in the preceding example, may be eliminated or replaced with other triglyceride oils.

One of the most important advantages of the use of rigid polyurethane foams in repairing damaged bone structure lies in the very important fact that a strong weight-bearing repair is obtained within a matter of hours. The high strength of the repaired structure is due in part to the high adhesiveness of the polyurethane foam to the bone tissue. It appears that chemical components of the polymerizing material actually react with chemical components of the bone structure, thus forming a unitary bond between the damaged bone and the polyurethane resin. As indicated above, the polyurethane polymer is non-toxic, non-irritating and non-allergenic.

Another very important advantage arising out of the use of the foamed polyurethane resin as a bonding agent for broken bones lies in the fact that the foamed polyurethane structure provides a lacunar system for the endochondral proliferation of new bone. X-ray studies have revealed the formation of new bone tissue through the polyurethane foam with the passage of time whereby a permanent and strong repair is finally achieved.

This is a continuation-in-part of my application Serial No. 606,743, filed August 28, 1956, now abandoned.

What I claim is:

1. In the orthopedic surgical treatment of fractured, diseased, deformed and necrotic bones, a method which comprises introducing a partially polymerized viscous liquid mixture comprising the reaction product of an aromatic polyisocyanate, a polyfunctional hydroxy compound, water, and a polymerization catalyst therefor, into the space between the bone segments to be united, and allowing the said liquid mixture to set to a polyurethane polymer while in contact with said bone segments, thus cementing said bone segments to each other.

2. In the orthopedic surgical treatment of fractured bones, the method which comprises the steps of removing soft bone tissue from the intermedullary canal of fractured bones adjacent the site of fracture to provide a space and introducing into said space a partially polymerized viscous liquid mixture comprising the reaction product of an aromatic polyisocyanate, a polyfunctional hydroxy compound, water, and a polymerization catalyst therefor, and allowing the said liquid mixture to set to a polyurethane polymer while in contact with said bone segments, thus cementing said bone segments to each other.

3. A method of joining bone structures to form a solid unitary mass which comprises the step of introducing into the space between said bone structures a partially polymerized viscous liquid mixture comprising the reaction product of an aromatic polyisocyanate, a polyfunctional hydroxy compound, water, and a polymerization catalyst therefor, and allowing the said liquid mixture to set to a polyurethane polymer while in contact with said bone segments, thus cementing said bone segments to each other.

4. In the orthopedic surgical treatment of fractured, diseased, deformed and necrotic bones, a method which comprises introducing a partially polymerized viscous liquid mixture comprising the reaction product of 30–60 parts by weight of a tolylene diisocyanate, 30–80 parts by weight of a polyol having a hydroxyl number of at least 250 and an acid number of not more than about 6, not more than about 1 part by weight of water and 5–10 parts by weight of a tertiary amine, the molar ratio of the diisocyanate to the polyol being within the range 2:1–3:1 into the space between the bone segments to be united, and allowing the said liquid mixture to set to a polyurethane polymer having a lacunar structure while in contact with said bone segments, thus cementing said bone segments to each other.

5. In the orthopedic surgical treatment of fractured, diseased, deformed and necrotic bones, a method which comprises the steps of removing soft bone tissue from the medullary canal adjoining the fracture to form spaces in each of the fractured segments and introducing a partially polymerized viscous liquid mixture comprising the reaction product of 30–60 parts by weight of a tolylene diisocyanate, 30–80 parts by weight of a polyol having a hydroxyl number of at least 250 and an acid number of not more than about 6, not more than about 1 part by weight of water and 5–10 parts by weight of a tertiary amine, the molar ratio of the diisocyanate to the polyol being within the range 2:1–3:1 into the space between the bone segments to be united, and allowing the said liquid mixture to set to a polyurethane polymer having a lacunar structure while in contact with said bone segments, thus cementing said bone segments to each other.

6. A method in accordance with claim 5 in which the polyol is a polyhydroxy polyether having a hydroxyl number of at least 350.

7. A method in accordance with claim 5 in which the polyol is a triglyceride of a hydroxyl-substituted fatty acid having a molecular weight within the range 1000–3000, a hydroxyl number between 250–450 and an acid number of less than about 6.

8. A method in accordance with claim 5 in which the major proportion of the polyol is castor oil.

9. A method in accordance with claim 5 in which the tertiary amine is tetrakis-(2-hydroxypropyl)-ethylenediamine.

References Cited in the file of this patent

UNITED STATES PATENTS

| | | |
|---|---|---|
| 2,537,070 | Longfellow | Jan. 9, 1951 |
| 2,543,780 | Hipps et al. | Mar. 6, 1951 |
| 2,577,279 | Simon | Dec. 4, 1951 |
| 2,690,987 | Jeffries et al. | Oct. 5, 1954 |
| 2,787,601 | Detrick et al. | Apr. 2, 1957 |
| 2,780,350 | Simon et al. | Feb. 5, 1957 |
| 2,833,730 | Barthel | May 6, 1958 |

FOREIGN PATENTS

| | | |
|---|---|---|
| 805,664 | Germany | May 25, 1951 |

OTHER REFERENCES

Block: "Bonding of Fractures by Plastic Adhesives," Journal of Bone and Joint Surgery, volume 40B, No. 4 Nov. 1958, 128—92, pages 804–810 relied on.

Wyandotte Chemical Corporation "Quadrel," 5 pages (pages 1 and 4 relied on), received March 25, 1958, Dec. 18, 1956. (Available in Science Library.)

"Operative Surgery" (Bickham), vol. 2, published by W. B. Saunders (Philadelphia), 1924, page 312 relied on. (Copy in Div. 55.)